United States Patent
Lin et al.

(10) Patent No.: US 11,892,234 B2
(45) Date of Patent: Feb. 6, 2024

(54) STAGED CRYOGENIC STORAGE TYPE SUPERCRITICAL COMPRESSED AIR ENERGY STORAGE SYSTEM AND METHOD

(71) Applicant: INSTITUTE OF ENGINEERING THERMOPHYSICS, CHINESE ACADEMY OF SCIENCES, Beijing (CN)

(72) Inventors: Xipeng Lin, Beijing (CN); Liang Wang, Beijing (CN); Haisheng Chen, Beijing (CN); Ningning Xie, Beijing (CN); Zheng Yang, Beijing (CN)

(73) Assignee: Institute of Engineering Thermophysics, Chinese Academy of Sciences, Beijing (CN)

( * ) Notice: Subject to any disclaimer, the term of this patent is extended or adjusted under 35 U.S.C. 154(b) by 1015 days.

(21) Appl. No.: 16/617,476

(22) PCT Filed: Jun. 1, 2017

(86) PCT No.: PCT/CN2017/086877
§ 371 (c)(1),
(2) Date: Nov. 26, 2019

(87) PCT Pub. No.: WO2018/218617
PCT Pub. Date: Dec. 6, 2018

(65) Prior Publication Data
US 2020/0182542 A1      Jun. 11, 2020

(51) Int. Cl.
*F25J 1/02*           (2006.01)
*F25J 1/00*           (2006.01)

(52) U.S. Cl.
CPC ............. *F25J 1/0237* (2013.01); *F25J 1/005* (2013.01); *F25J 1/0012* (2013.01); *F25J 1/0223* (2013.01);
(Continued)

(58) Field of Classification Search
CPC ........ F25J 1/0237; F25J 1/0012; F25J 1/0223; F25J 1/0234; F25J 1/0225; F25J 1/0214;
(Continued)

(56) References Cited

U.S. PATENT DOCUMENTS 9,217,423 B2   12/2015   Chen
2010/0083660 A1   4/2010   Nakhamkin
(Continued)

FOREIGN PATENT DOCUMENTS

CN   102052256 A   5/2011
CN   104279012 A   1/2015
(Continued)

OTHER PUBLICATIONS

Japanese Office Action dated Jan. 15, 2021, issued in Japanese Patent Application No. 2019-565850, filed Nov. 28, 2019, 6 pages.
(Continued)

*Primary Examiner* — Brian M King
*Assistant Examiner* — Ibrahim A. Michael Adeniji
(74) *Attorney, Agent, or Firm* — Davis Wright Tremaine LLP; Michael J. Donohue

(57) ABSTRACT

The present disclosure provides a supercritical compressed air energy storage system. The supercritical compressed air energy storage system includes a supercritical liquefaction subsystem, an evaporation and expansion subsystem, a staged cryogenic storage subsystem, a heat storage and heat exchange subsystem, and a cryogenic energy compensation subsystem, the staged cryogenic storage subsystem being used for implementing the staged storage and release of cryogenic energy, improving efficiency of recovering cryogenic energy during energy release and energy storage, and thereby improving cycle efficiency of the system. The present disclosure does not need to provide any inputs of additional cryogenic energy and heat energy input externally, and has the advantages of high cycle efficiency, low cost, independent operation, environmental friendliness, and no limitation on terrain conditions, and it is suitable for large-scale commercial applications.

18 Claims, 5 Drawing Sheets

(52) U.S. Cl.
CPC ............ *F25J 1/0234* (2013.01); *F25J 1/0242* (2013.01); *F25J 2230/22* (2013.01); *F25J 2230/24* (2013.01); *F25J 2230/40* (2013.01); *F25J 2240/04* (2013.01); *F25J 2240/10* (2013.01)

(58) Field of Classification Search
CPC ........ F25J 1/0219; F25J 1/0208; Y02E 60/16; F02C 6/16; F17C 7/02
See application file for complete search history.

(56) References Cited

U.S. PATENT DOCUMENTS

| | | | |
|---|---|---|---|
| 2012/0216520 A1* | 8/2012 | Chen | F25J 3/04193 60/412 |
| 2015/0218968 A1* | 8/2015 | Sinatov | F01K 3/18 60/659 |
| 2017/0016577 A1* | 1/2017 | Sinatov | F25J 1/004 |
| 2017/0058768 A1* | 3/2017 | Bergins | F25J 1/0045 |

FOREIGN PATENT DOCUMENTS

| | | |
|---|---|---|
| CN | 105509528 A | 4/2016 |
| CN | 105697066 A | 6/2016 |
| CN | 205349530 U | 6/2016 |
| CN | 205876399 U | 1/2017 |
| EP | 2500565 A1 | 9/2012 |
| JP | 2013510257 A | 3/2013 |
| WO | 2015138817 A1 | 9/2015 |

OTHER PUBLICATIONS

Extended European Search Report dated Dec. 23, 2020, issued in corresponding Application No. EP 17911475.6, filed Jun. 1, 2017.
International Search Report dated Mar. 2, 2018, issued in corresponding International Patent Application No. PCT/CN2017/086877, filed Jun. 1, 2017, 4 pages.
Australian Examination Report dated Dec. 18, 2020, issued in corresponding Application No. AU2017416627A1, filed Jun. 1, 2017.
Guizzi, G., et al., "Thermodynamic Analysis of a Liquid Air Energy Storage System," Energy 93:1639-1647, Oct. 2015.

* cited by examiner

STAGED CRYOGENIC STORAGE TYPE SUPERCRITICAL COMPRESSED AIR ENERGY STORAGE SYSTEM AND METHOD

CROSS-REFERENCE TO RELATED APPLICATION

This application is a Section 371 National Stage Application of International Application No. PCT/CN2017/086877, filed on Jun. 1, 2017, entitled "STAGED CRYOGENIC STORAGE TYPE SUPERCRITICAL COMPRESSED AIR ENERGY STORAGE SYSTEM AND METHOD," which is incorporated herein by reference in entirety.

BACKGROUND

Technical Field

The present disclosure relates to the fields of renewable energy source, compressed air energy storage, distributed energy source, and the like, and in particular, to a staged cryogenic storage type supercritical compressed air energy storage system and a staged cryogenic storage type supercritical compressed air energy storage method.

Description of the Related Art

In addition to pumped energy storage, compressed air energy storage is the only well-developed physical energy storage technology for large-scale power grid electrical energy storage. It can be applied in peak shaving of a power grid and stable output of renewable energy source such as solar, wind energy and the like. Conventional compressed air storage utilizes compressors to compress air into a large-scale cavern and store it, then utilizes fossil fuels to make it expand and do work by means of combustion and heat generation during an energy release stage, therefore it is suitable for large-scale systems and has the advantages of low cost and long life. However, its construction site is limited, and it would cause pollution due to the combustion of fossil energy needed. Thermal storage type compressed air energy storage recovers compression heat and utilizes it for reheat in turbine stages during an energy release process, which refers to a Stirling Cycle. It is of high efficiency and environmentally friendly. However, its application is still limited to topography condition of gas storage cavern. Large-scale high-pressure resistance container pipes may be used to replace the large-scale gas storage caverns, which is free from the limitation of topography condition and suitable for wide application. However, the use of metal pressure containers to store high-pressure air is expensive, and a ratio of the container cost to the total cost increases as the storage time increases, which adversely affects cost return and large-scale application of the compressed air energy storage systems.

Working medium in a Liquid Air Energy Storage System (LAES) is stored in the form of liquid at atmospheric pressure or low pressure, which not only greatly increases energy storage density, but also greatly reduces construction cost and floor space of the system. In the early, liquid air technology still relies on the combustion of the fossil fuels in the energy release process. There is no cryogenic storage design in the system, it relies on the supply of external liquid air, and is mainly combined with the conventional air separation system, without considering cryogenic energy recovery in the energy release stage. Although it has relatively high technology maturity, the actual electricity generation efficiency of the system is very low. Some literatures disclose a new liquid air energy storage technology. Compared with the previous technology, it does not include any combustion process, only air is used as the working medium, the heat storage and cryogenic storage technology are added to recover cryogenic energy from evaporation of the liquid air for air liquefaction process, thereby improving the efficiency of the system. Some literatures disclose a supercritical compressed air energy storage system that recovers and stores cryogenic energy, combining an air supercritical liquefaction cycle, an energy storage system, and a Rankine Cycle. In the energy storage process, the supercritical air in the compressor outlet absorbs cryogenic energy to be cooled down, and isentropic throttling/isentropic expansion is/are performed on it, and low-pressure liquefied air is stored release process, the liquid air boosted by a cryopump absorbs heat and recovers the cryogenic energy, then it is gasified and reheated by a reheater, and then it enters the turbine to do work. It also has the advantages of unrestricted construction site and zero pollution emission. In addition, since the pressure and flow rate at the turbine inlet can be kept stable, it addresses drawbacks such as pressure adjustment between the gas storage device of the adiabatic compressed air energy storage system and the turbine inlet, variable pressure operation of the compressor outlet and the like, thereby the power machine may operate stably in a high efficiency.

In the above research, although the cryogenic energy is recovered for the liquefaction process, the utilization rate of the cryogenic energy is still insufficient, and the cryogenic storage capacity in the storage and release processes is not equal. In the subsequent research, the optimized Claude Cycle is used to absorb more cryogenic energy and realize self-compensation for the cryogenic energy of the system in the liquefaction process. Some literatures disclose a two-fluid cryogenic storage cycle of propane and methanol, and it is integrated with a nuclear power plant so that the nuclear power plant may substantially operate at full load while meeting strain demand. The liquid working medium acts as both heat transfer working medium and cryogenic storage working medium, which reduces the irreversible loss of the cryogenic energy. However, the methanol and the propane are both flammable, explosive and toxic hazardous chemicals, which are prone to explosion when exposed to oxygen-rich areas in the air liquefaction process. Large-scale long-term storage for them is unimaginable in terms of safety, economy and maintenance costs.

In summary, in the current research, the research on the utilization of the cryogenic energy in the liquefaction process is very sufficient, but the research on recovery of cryogenic energy of liquid air in evaporation cold boxes is obviously insufficient. The existing invention is still not satisfied with the requirements for large-scale, low cost, safe and reliable energy storage, the technology still needs to be further optimized.

SUMMARY

(I) Technical Problem to be Solved

In view of the above problems, the present disclosure provides a staged cryogenic storage subsystem and a supercritical compressed air energy storage system for solving the problem of insufficient cryogenic energy recovery and not satisfying the requirements for large-scale, low cost, safe and reliable energy storage.

(II) Technical Solution

According to an aspect of the present disclosure, it provides a staged cryogenic storage type supercritical compressed air energy storage system, comprising a supercritical liquefaction subsystem for converting input gaseous air into liquid air and an evaporation and expansion subsystem for converting liquid air into gaseous air, wherein the staged cryogenic storage type supercritical compressed air energy storage system further comprises:
  a staged cryogenic storage subsystem for storing and/or releasing cryogenic energy when the gaseous air or the liquid air is converted.

As an example, the staged cryogenic storage subsystem comprises at least one liquefaction cold box, at least one deep cooling cryogenic storage cycle, and at least one intermediate cooling cryogenic storage cycle,
  wherein the deep cooling cryogenic storage cycle is connected with the liquefaction cold box for releasing cryogenic energy from a deep cooling temperature to a room temperature,
  wherein the intermediate cooling cryogenic storage cycle is connected with the liquefaction cold box for releasing cryogenic energy from the deep cooling temperature to an intermediate cooling temperature.

As an example, each liquefaction cold box includes at least one deep cooling cycle internal flow passage, at least one intermediate cooling cycle internal flow passage, at least one supercritical flow passage, at least one cryogenic energy compensation flow passage, and at least one cryogenic energy recovery flow passage,
  wherein each deep cooling cryogenic storage cycle includes at least one deep cooling storage tank, at least one deep cooling cycle fan, and at least one deep cooling cycle external flow passage, and each deep cooling cycle external flow passage is connected with at least one deep cooling storage tank and at least one deep cooling cycle fan, and connected with a deep cooling cycle internal flow passage in the liquefaction cold box to form a complete cycle flow passage,
  wherein each intermediate cooling cryogenic storage cycle includes at least one intermediate cooling storage tank, at least one intermediate cooling cycle fan, and at least one intermediate cooling cycle external flow passage, and each intermediate cooling cycle external flow passage is connected with at least one intermediate cooling storage tank and at least one intermediate cooling cycle fan, and connected with an intermediate cooling cycle internal flow passage in the liquefaction cold box to form a complete cycle flow passage.

As an example, the staged cryogenic storage subsystem further comprises at least one evaporation cold box, and the evaporation cold box and the liquefaction cold box share at least one deep cooling cryogenic storage cycle and at least one intermediate cooling cryogenic storage cycle,
  wherein the deep cooling cryogenic storage cycle is connected with the evaporation cold box to store cryogenic energy from the deep cooling temperature to the room temperature,
  wherein the intermediate cooling cryogenic storage cycle is connected with the evaporation cold box to store cryogenic energy from the deep cooling temperature to the intermediate cooling temperature.

As an example, the evaporation cold box comprises at least one deep cooling cycle internal flow passage, at least one intermediate cooling cycle internal flow passage, and at least one supercritical flow passage,
  wherein each deep cooling cycle external flow passage in the deep cooling cryogenic storage cycle is connected with at least one deep cooling storage tank and at least one deep cooling cycle fan, and connected with a deep cooling cycle internal flow passage in the evaporation cold box to form a complete cycle flow passage,
  wherein each intermediate cooling cycle external flow passage in the intermediate cooling cryogenic storage cycle is connected with at least one intermediate cooling storage tank and at least one intermediate cooling cycle fan, and connected with an intermediate cooling cycle internal flow passage in the evaporation cold box to form a complete cycle flow passage.

As an example, the liquefaction cold box and the evaporation cold box each comprise a heat exchanger group, a cryogenic insulation material, and a sealed housing,
  wherein the heat exchanger group comprises at least one plate-fin heat exchanger, or at least one plate heat exchanger, or at least one spiral wounded tube,
  wherein the cryogenic insulation material comprises one of glass fiber mat, pearlite, rock wool, and vacuum board, or a combination thereof.

As an example, the staged cryogenic storage subsystem comprises at least one cold box, at least one deep cooling cryogenic storage cycle, and at least one intermediate cooling cryogenic storage cycle,
  wherein the cold box is used as a liquefaction cold box or an evaporation cold box,
  wherein the deep cooling cryogenic storage cycle is connected with the cold box for releasing cryogenic energy from a deep cooling temperature to a room temperature when the cold box is used as the liquefaction cold box, and for storing cryogenic energy from a deep cooling temperature to a room temperature when the cold box is used as the evaporation cold box,
  wherein the intermediate cooling cryogenic storage cycle is connected with the cold box for releasing cryogenic energy from a deep cooling temperature to an intermediate cooling temperature when the cold box is used as the liquefaction cold box, and for storing cryogenic energy from the deep cooling temperature to the intermediate cooling temperature when the cold box is used as the evaporation cold box.

As an example, each cold box includes at least one deep cooling cycle internal flow passage, at least one intermediate cooling cycle internal flow passage, and at least one supercritical flow passage,
  wherein each deep cooling cryogenic storage cycle includes at least one deep cooling storage tank, at least one deep cooling cycle fan, and at least one deep cooling cycle external flow passage, and each deep cooling cycle external flow passage is connected with at least one deep cooling storage tank and at least one deep cooling cycle fan, and connected with a deep cooling cycle internal flow passage in the cold box to form a complete cycle flow passage,
  wherein each intermediate cooling cryogenic storage cycle includes at least one intermediate cooling storage tank, at least one intermediate cooling cycle fan, and at least one intermediate cooling cycle external flow passage, and each intermediate cooling cycle external flow passage is connected with at least one intermediate cooling storage tank and at least one intermediate cooling cycle fan, and connected with an intermediate cooling cycle internal flow passage in the cold box to form a complete cycle flow passage.

As an example, in a case where the number of the intermediate cooling cryogenic storage cycles is greater than 1, the respective intermediate cooling cryogenic storage cycles store cryogenic energy between different intermediate cooling temperatures.

As an example, in a case where the at least one intermediate cooling storage tank comprises two intermediate cooling storage tanks, the two intermediate cooling storage tanks are connected in series or in parallel;
  when the two intermediate cooling storage tanks are connected in series, one of the two intermediate cooling storage tanks is divided into a deep cooling side and a room temperature side for storing cryogenic energy from a deep cooling temperature to a room temperature therein; the other of the two intermediate cooling storage tanks is divided into an intermediate cooling side and a room temperature side for storing cryogenic energy from an intermediate cooling temperature to a room temperature therein, and an intermediate cooling cycle fan is connected in series between the room temperature sides of the two intermediate cooling storage tanks;
  when the two intermediate cooling storage tanks are connected in parallel, the two intermediate cooling storage tanks each store cryogenic energy from a deep cooling temperature to an intermediate cooling temperature therein.

As an example, the deep cooling storage tank and the intermediate cooling storage tank are both of a packed bed structure, and the packed bed structure is filled with a cryogenic resistant storage material therein, cycle working medium flows in gaps of the filled cryogenic resistant storage material and exchanges cold amount,
  wherein the cycle working medium is one of air, nitrogen, argon and helium, or a combination thereof, and the cryogenic resistant storage material is one of ceramic, stone, alumina, metal, encapsulated stage change particles, chemical reaction particles, or a combination thereof.

As an example, the deep cooling cycle fan and the intermediate cooling cycle fan are both bidirectional cycle fans, flow passages of the fans are sealed, and air flow rate of the fans is adjustable.

As an example, the deep cooling temperature does not exceed cryogenic liquid temperature in a cryogenic insulation tank 30K, and the intermediate cooling temperature is between the deep cooling temperature and the room temperature.

As an example, the supercritical liquefaction subsystem comprises an electric motor, at least one multistage compressor, a drying and purifying device, a proportional adjustment device, a liquid expander, a gas-liquid separator and a cryogenic insulation tank,
  wherein the electric motor is connected with the multistage compressor by a shaft connection, stages of the multistage compressor are connected by two ways, one way is the shaft connection, and the other is a gas path connection; the drying and purifying device is disposed on a gas path of the multistage compressor for reducing component contents of water vapor, carbon dioxide, and alkane in the air,
  wherein the electric motor is configured to drive the multistage compressor to perform a multistage compression of the input gaseous air to form supercritical air, the supercritical air at an outlet of the multistage compressor enters the proportional adjustment device to be split, and one split branch of supercritical air enters the supercritical flow passage in the liquefaction cold box of the staged cryogenic storage subsystem, and then passes through the liquid expander for expansion and the gas-liquid separator for separation to form liquid air, and then the liquid air enters the cryogenic insulation tank through a liquid-side outlet of the gas-liquid separator.

As an example, the proportional adjustment device of the supercritical liquefaction subsystem is provided with a flow rate adjusting mechanism therein for adjusting a proportion of flow rates of the supercritical air in two branches split by the proportional adjustment device.

As an example, the evaporation and expansion subsystem comprises at least one cryopump, a multistage expander and an electric generator, and the liquid air output from the cryogenic insulation tank passes through the cryopump and the supercritical flow passage in the evaporation cold box of the staged cryogenic storage subsystem and evaporates to form the supercritical air, and the supercritical air formed by evaporation enters the multistage expander to do work and drive the electric generator to generate electricity; the electric generator is connected with the multistage expander by shaft connection, stages of the multistage expander are connected by two ways, one way is the shaft connection, and the other is a gas path connection.

As an example, the evaporation and expansion subsystem further comprises a preheater placed at a position before the supercritical air enters the multistage expander, and exhaust gas from an outlet of the multistage expander enters the preheater to form a gas circuit for recovering heat energy of higher temperature at the outlet of the multistage expander.

As an example, the preheater of the evaporation and expansion subsystem is one of a plate-fin heat exchanger, a plate heat exchanger, a shell-tube heat exchanger, a spiral plate heat exchanger, or a combination thereof.

As an example, the compressed air energy storage system further includes a heat storage and heat exchange subsystem, wherein the heat storage and heat exchange subsystem comprises at least one heat storage tank, at least one room temperature tank, at least two heat regenerators, at least two reheaters, and the respective heat regenerators are independent of each other and the respective reheaters are independent of each other,
  wherein an outlet of the room temperature tank is connected with one end of each heat regenerator, and the other end of each heat regenerator is connected with an inlet of the heat storage tank,
  wherein an outlet of the heat storage tank is connected with one end of each reheater, and the other end of each reheater is connected with an inlet of the room temperature tank,
  wherein at least one heat regenerator is connected between the stages of the multistage compressor of the supercritical liquefaction subsystem, and at least one heat regenerator is connected between the multistage compressor of the supercritical liquefaction subsystem and the proportional adjustment device,
  wherein at least one reheater is connected to the multistage expander at a position before the supercritical air formed by evaporation enters the multistage expander, and at least one reheater is connected between the stages of the multistage expander in a gas path of the evaporation and expansion subsystem.

As an example, the heat storage and heat exchange subsystem further comprises a residual heat utilization device located between an outlet of the reheater and an inlet of the room temperature tank for recovering residual heat of heat storage working medium at the outlet of the reheater.

As an example, the residual heat utilization device of the heat storage and heat exchange subsystem is a heat supply and heat exchanger or a refrigeration unit or a combination thereof.

As an example, the compressed air energy storage system further includes a cryogenic energy compensation subsystem, wherein the cryogenic energy compensation subsystem comprises a cryogenic expansion unit and a mixer, the other branch of supercritical air split by the proportional adjustment device of the supercritical liquefaction subsystem enters the cryogenic energy compensation flow passage in the liquefaction cold box of the staged cryogenic storage subsystem and cools, and then enters the cryogenic expansion unit to expand and cools further, and mixes with cryogenic air at a gas-side outlet of the gas-liquid separator in the mixer, the cryogenic energy is recovered by the cryogenic energy recovery flow passage in the liquefaction cold box of the staged cryogenic storage subsystem, and then the air returns to the inlet of the multistage compressor or returns to gas paths between the stages of the multistage compressor.

As an example, the cold box, when connected with the cryogenic energy compensation subsystem, further comprises at least one cryogenic energy compensation flow passage and at least one cryogenic energy recovery flow passage; the other branch of supercritical air split by the proportional adjustment device of the supercritical liquefaction subsystem enters the cryogenic energy compensation flow passage in the cold box of the staged cryogenic storage subsystem and cools, and then enters the cryogenic expansion unit to expand and cools further, and mixes with cryogenic air at the gas-side outlet of the gas-liquid separator in the mixer, the cryogenic energy is recovered by the cryogenic energy recovery flow passage in the cold box of the staged cryogenic storage subsystem, and then the air returns to the inlet of the multistage compressor or returns to gas paths between the stages of the multistage compressor.

According to another aspect of the present disclosure, it provides a staged cryogenic storage type supercritical compressed air energy storage method, applied to the staged cryogenic storage type supercritical compressed air energy storage system according to any one of the above embodiments, comprising:
converting input gaseous air into liquid air by the supercritical liquefaction subsystem;
converting liquid air into gaseous air by the evaporation and expansion subsystem;
and storing and/or releasing cryogenic energy by the staged cryogenic storage subsystem when the gaseous air or the liquid air is converted.

As an example, the converting input gaseous air into liquid air by the supercritical liquefaction subsystem comprises:
driving the multistage compressor by the electric motor to perform a multistage compression of the input air to form supercritical air, enabling the supercritical air at an outlet of the multistage compressor to enter the proportional adjustment device to be split, and enabling one split branch of supercritical air to enter the supercritical flow passage in the liquefaction cold box of the staged cryogenic storage subsystem, and then to pass through the liquid expander for expansion and the gas-liquid separator for separation to form the liquid air, and then enabling the liquid air to enter the cryogenic insulation tank through a liquid-side outlet of the gas-liquid separator.

As an example, the converting liquid air into gaseous air by the evaporation and expansion subsystem comprises:
passing and evaporating the liquid air output from the cryogenic insulation tank through the cryopump and the supercritical flow passage in the evaporation cold box of the staged cryogenic storage subsystem to form the supercritical air, and enabling the supercritical air formed by evaporation to enter the multistage expander to do work and drive the electric generator to generate electricity.

As an example, the storing and/or releasing cryogenic energy by the staged cryogenic storage subsystem when the gaseous air or the liquid air is converted comprises:
driving cycle working medium by a cycle fan to input cryogenic energy in a deep cooling storage tank and an intermediate cooling storage tank into a deep cooling cycle internal flow passage and an intermediate cooling cycle internal flow passage in the liquefaction cold box respectively, to provide supercritical air in a supercritical flow passage with cryogenic energy for liquefaction; and
driving cycle working medium by the cycle fan to input cryogenic energy in a deep cooling storage tank and an intermediate cooling storage tank into a deep cooling cycle internal flow passage and an intermediate cooling cycle internal flow passage in the evaporation cold box respectively, to provide supercritical air in a supercritical flow passage with heat energy for evaporation and store cryogenic energy.

As an example, the method further includes: storing the heated heat storage working medium in a heat storage tank and returning the cooled heat storage working medium to a room temperature tank by a heat storage and heat exchange subsystem.

As an example, the storing the heated heat storage working medium in a heat storage tank and returning the cooled heat storage working medium to a room temperature tank by a heat storage and heat exchange subsystem comprises:
storing the heat storage working medium heated by compression heat in various heat regenerators into the heat storage tank;
allowing the heat storage working medium at liquid-side outlets of various reheaters to further absorb heat of the heat storage working medium by a residual heat utilization device and output cryogenic energy close to a room temperature, and returning the cooled heat storage working medium to the room temperature tank.

As an example, the method further includes: compensating for cryogenic energy autonomously by a cryogenic energy compensation subsystem.

As an example, the compensating for cryogenic energy autonomously by a cryogenic energy compensation subsystem comprises:
in a case where the staged cryogenic storage subsystem comprises at least one liquefaction cold box and at least one evaporation cold box, enabling the other branch of supercritical air split by the proportional adjustment device of the supercritical liquefaction subsystem to enter the cryogenic energy compensation flow passage in the liquefaction cold box of the staged cryogenic storage subsystem and cool, and then to enter the cryogenic expansion unit to expand and cool further, and to mix with cryogenic air at a gas-side outlet of the gas-liquid separator in the mixer, so that the cryogenic energy is recovered by the cryogenic energy recovery flow passage in the liquefaction cold box of the staged cryogenic storage subsystem, and then returning the air to the inlet of the multistage compressor or to gas paths between the stages of the multistage compressor; or in a case where the staged cryogenic storage subsystem comprises at least one cold box for liquefaction and evaporation, while the cold box is connected with the cryogenic energy compensation subsystem and further comprises at least one cryogenic energy compensation flow passage and at least one cryogenic energy recovery flow passage, enabling the other branch of supercritical air split by the proportional adjustment device of the supercritical liquefaction subsystem to enter the cryogenic energy compensation flow passage in the cold box of the staged cryogenic storage subsystem and cool, and then to enter the cryogenic expansion unit to expand and cool further, and to mix with cryogenic air at a gas-side outlet of the gas-liquid separator in the mixer, so that the cryogenic energy is recovered by the cryogenic energy recovery flow passage in the cold box of the staged cryogenic storage subsystem, and then returning the air to the inlet of the multistage compressor or to gas paths between the stages of the multistage compressor.

According to another aspect of the present disclosure, it provides a staged cryogenic storage subsystem, comprising at least one liquefaction cold box, at least one deep cooling cryogenic storage cycle, and at least one intermediate cooling cryogenic storage cycle, wherein the deep cooling cryogenic storage cycle is connected with the liquefaction cold box for releasing cryogenic energy from a deep cooling temperature to a room temperature, wherein the intermediate cooling cryogenic storage cycle is connected with the liquefaction cold box for releasing cryogenic energy from a deep cooling temperature to an intermediate cooling temperature or storing cryogenic from the intermediate cooling temperature to the room temperature.

As an example, the liquefaction cold box includes at least one deep cooling cycle internal flow passage, at least one intermediate cooling cycle internal flow passage, at least one supercritical flow passage, at least one cryogenic energy compensation flow passage, and at least one cryogenic energy recovery flow passage, wherein each deep cooling cryogenic storage cycle includes at least one deep cooling storage tank, at least one deep cooling cycle fan, and at least one deep cooling cycle external flow passage, and each deep cooling cycle external flow passage is connected with at least one deep cooling storage tank and at least one deep cooling cycle fan, and connected with a deep cooling cycle internal flow passage in the liquefaction cold box to form a complete cycle flow passage, wherein each intermediate cooling cryogenic storage cycle includes at least one intermediate cooling storage tank, at least one intermediate cooling cycle fan, and at least one intermediate cooling cycle external flow passage, and each intermediate cooling cycle external flow passage is connected with at least one intermediate cooling storage tank and at least one intermediate cooling cycle fan, and connected with an intermediate cooling cycle internal flow passage in the liquefaction cold box to form a complete cycle flow passage.

As an example, the staged cryogenic storage subsystem further comprises at least one evaporation cold box, and the evaporation cold box and the liquefaction cold box share at least one deep cooling cryogenic storage cycle and at least one intermediate cooling cryogenic storage cycle;

wherein the deep cooling cryogenic storage cycle is connected with the evaporation cold box to store cryogenic energy from a deep cooling temperature to a room temperature, wherein the intermediate cooling cryogenic storage cycle is connected with the evaporation cold box to store cryogenic energy from a deep cooling temperature to an intermediate cooling temperature or to release cryogenic energy from the intermediate cooling temperature to the room temperature.

As an example, the evaporation cold box comprises at least one deep cooling cycle internal flow passage, at least one intermediate cooling cycle internal flow passage, and at least one supercritical flow passage, each deep cooling cycle external flow passage is connected with at least one deep cooling storage tank and at least one deep cooling cycle fan, and connected with a deep cooling cycle internal flow passage in the evaporation cold box to form a complete cycle flow passage, each intermediate cooling cycle external flow passage is connected with at least one intermediate cooling storage tank and at least one intermediate cooling cycle fan, and connected with an intermediate cooling cycle internal flow passage in the evaporation cold box to form a complete cycle flow passage.

According to another aspect of the present disclosure, it provides a staged cryogenic storage subsystem, comprising a cold box, at least one deep cooling cryogenic storage cycle, and at least one intermediate cooling cryogenic storage cycle, wherein the cold box is used as a liquefaction cold box or an evaporation cold box, wherein the deep cooling cryogenic storage cycle is connected with the cold box for releasing cryogenic energy from a deep cooling temperature to a room temperature when the cold box is used as the liquefaction cold box, and for storing cryogenic energy from a deep cooling temperature to a room temperature when the cold box is used as the evaporation cold box, wherein the intermediate cooling cryogenic storage cycle is connected with the cold box for releasing cryogenic energy from a deep cooling temperature to an intermediate cooling temperature or storing cryogenic energy from the intermediate cooling temperature to the room temperature when the cold box is used as the liquefaction cold box, and for storing cryogenic energy from the deep cooling temperature to the intermediate cooling temperature or releasing cryogenic energy from the intermediate cooling temperature to the room temperature when the cold box is used as the evaporation cold box.

As an example, each cold box includes at least one deep cooling cycle internal flow passage, at least one intermediate cooling cycle internal flow passage, and at least one supercritical flow passage, wherein each deep cooling cryogenic storage cycle includes at least one deep cooling storage tank, at least one deep cooling cycle fan, and at least one deep cooling cycle external flow passage, and each deep cooling cycle external flow passage is connected with at least one deep cooling storage tank and at least one deep cooling cycle fan, and connected with a deep cooling cycle internal flow passage in the cold box to form a complete cycle flow passage, wherein each intermediate cooling cryogenic storage cycle includes at least one intermediate cooling storage tank, at least one intermediate cooling cycle fan, and at least one intermediate cooling cycle external flow passage, and each intermediate cooling cycle external flow passage is connected with at least one intermediate cooling storage tank and at least one intermediate cooling cycle fan, and connected with an intermediate cooling cycle internal flow passage in the cold box to form a complete cycle flow passage.

As an example, in a case where the number of the intermediate cooling cryogenic storage cycles is greater than 1, the respective intermediate cooling cryogenic storage cycles store cryogenic energy at different intermediate cooling temperatures.

As an example, in a case where the at least one intermediate cooling storage tank comprises two intermediate cooling storage tanks, the two intermediate cooling storage tanks are connected in series or in parallel;

when the two intermediate cooling storage tanks are connected in series, one of the two intermediate cooling storage tanks is divided into a deep cooling side and a room temperature side for storing cryogenic energy from a deep cooling temperature to a room temperature therein; the other of the two intermediate cooling storage tanks is divided into an intermediate cooling side and a room temperature side for storing cryogenic energy from an intermediate cooling temperature to a room temperature therein, and an intermediate cooling cycle fan is connected in series between the room temperature sides of the two intermediate cooling storage tanks;

when the two intermediate cooling storage tanks are connected in parallel, the two intermediate cooling storage tanks each store cryogenic energy from a deep cooling temperature to an intermediate cooling temperature therein.

As an example, the deep cooling storage tank and the intermediate cooling storage tank are both of a packed bed structure, and the packed bed structure is filled with a cryogenic resistant storage material therein, cycle working medium flows in gaps of the filled cryogenic resistant storage material and exchanges cold amount, wherein the cycle working medium is one of air, nitrogen, argon and helium, or a combination thereof, and the cryogenic resistant storage material is one of ceramic, stone, alumina, metal, encapsulated stage change particles, chemical reaction particles, or a combination thereof.

As an example, the deep cooling cycle fan and the intermediate cooling cycle fan are both bidirectional cycle fans, flow passages of the fans are sealed, and air flow rate of the fans is adjustable.

As an example, the deep cooling temperature does not exceed cryogenic liquid temperature in a cryogenic insulation tank 30K, and the intermediate cooling temperature is between the deep cooling temperature and the room temperature.

As an example, the liquefaction cold box and the evaporation cold box each comprise a heat exchanger group, a cryogenic insulation material, and a sealed housing, wherein the heat exchanger group comprises at least one plate-fin heat exchanger, or at least one plate heat exchanger, or at least one coiled tubular heat exchanger, wherein the cryogenic insulation material comprises one of glass fiber mat, pearlite, rock wool, and vacuum board, or a combination thereof.

(III) Beneficial Effect

It can be seen from the above technical solutions that the staged cryogenic storage supercritical compressed air energy storage system and method according to the present disclosure have the following beneficial effects:

I) In the present disclosure, the staged cryogenic storage subsystem stores cryogenic energy capacity of intermediate temperature by adding an intermediate cooling cryogenic energy cycle, it has the advantages of increasing recovery efficiency of the cryogenic energy and solving the problem of insufficient cryogenic energy recovery, thereby improving cycle efficiency of the system and reducing outlet pressure of the compressor.

II) In the present disclosure, the cycling working medium used is one of air, nitrogen, argon and helium or a mixture thereof, which may be simply and easily obtained and are safe and reliable, thereby it has the advantages of low cost, high efficiency, environmental friendship, and applicability for large-scale application.

III) In the present disclosure, a cryogenic energy compensation system and a heat storage heat exchange system are further included for autonomous compensation of the cryogenic energy and recovery of compressed heat in the energy storage process, and it can independently operate with a high efficiency without input from external cold or heat sources, thereby it is not limited by the topography conditions.

REFERENCE NUMERAL

Figure 1:
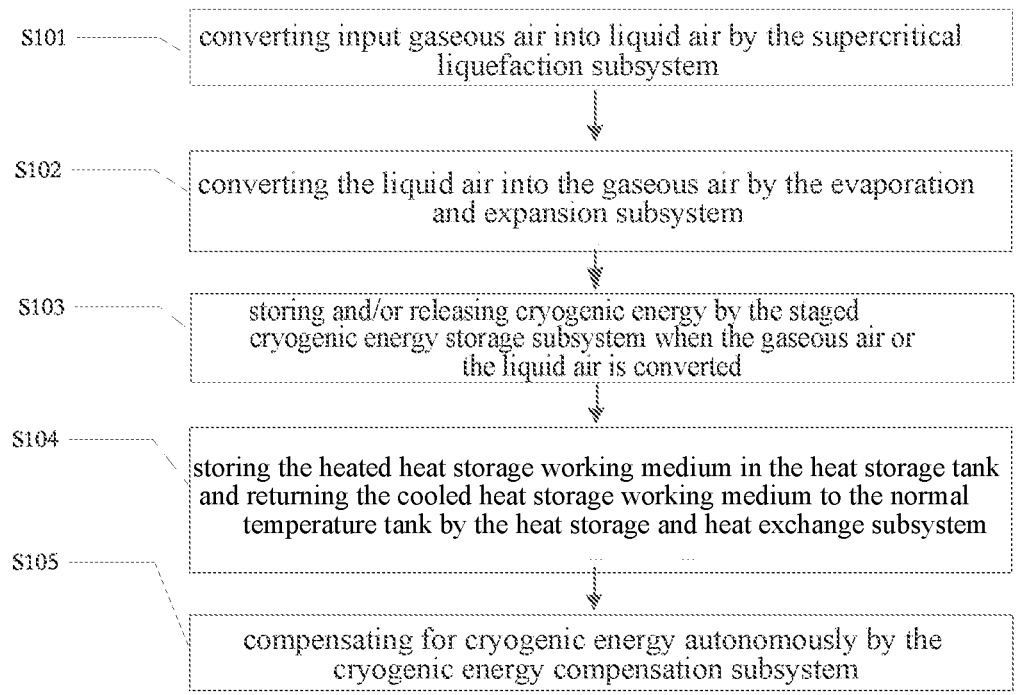
FIG. 1 is a flow chart of a staged cryogenic storage supercritical compressed air energy storage method according to an embodiment of the present disclosure.

100 electric motor
101 first stage compressor
102 drying and purifying device 103 final stage compressor
104 proportional adjustment device
105 liquid expander
106 gas-liquid separator
107 cryogenic insulation tank
108 cryogenic expansion unit
109 mixer
201 heat storage tank
202 room temperature tank
203 first stage heat regenerator
204 final stage heat regenerator
205 first stage reheater
206 final stage reheater
207 residual heat utilization device
301 cryopump
302 preheater
303 first stage expander
304 final stage expander
305 electric generator
401 401' deep cooling storage tank
402 402' intermediate cooling storage tank
4021 4021' intermediate and lower cooling storage tank
4022 4022' intermediate and upper cooling storage tank
403 liquefaction cold box
4031 deep cooling cycle internal flow passage of liquefaction cold box
4032 intermediate cooling cycle internal flow passage of liquefaction cold box
4033 supercritical flow passage of liquefaction cold box
4034 cryogenic energy compensation flow passage of liquefaction cold box
4035 cryogenic energy recovery flow passage of liquefaction cold box
404 evaporation cold box
4041 deep cooling cycle internal flow passage of evaporation cold box
4042 intermediate cooling cycle internal flow passage of evaporation cold box
4043 evaporation flow passage of evaporation cold box
405 405' deep cooling cycle fan
4051 4051' deep cooling cycle external flow passage
406 406' intermediate cooling cycle fan
4061 4061' intermediate cooling cycle external flow passage
407 liquefaction and evaporation dual-purpose cold box

DETAILED DESCRIPTION OF PREFERRED EMBODIMENTS

In order to understand objectives, technical solutions and advantages of the present disclosure more clearly, the present disclosure will be further described in detail below with reference to the specific embodiments of the present disclosure.

It should be noted that, in the drawings or the description of the specification, the same reference numerals are used to indicate similar or identical parts. Moreover, in the drawings, the shape or thickness in the embodiments may be amplified for simplification and convenient indication. Furthermore, elements or implementations that are not shown or described in the drawings are in the form known to those skilled in the art. Additionally, although particular values are given as examples of parameters herein, it should be understood that the parameters need not be exactly equal to the corresponding values, but rather may approximate the corresponding values within acceptable error tolerances or design constraints.

The preferred embodiments of the present disclosure will be given below on the basis of the above embodiments. It should be noted that the preferred embodiments are only intended for understanding the present disclosure, rather than limiting the scope of the present disclosure. Moreover, the features in the preferred embodiments are applicable to both the method embodiments and the device embodiments, unless otherwise specified, and the technical features appearing in the same or different embodiments may be combined in a case where no conflict arises.

The staged cryogenic storage type supercritical compressed air energy storage system according to the present disclosure includes: a supercritical liquefaction subsystem for converting input gaseous air into liquid air; an evaporation and expansion subsystem for converting liquid air into gaseous air; and a staged cryogenic storage subsystem for storing and/or releasing cryogenic energy when the gaseous air or the liquid air is converted.

The staged cryogenic storage subsystem comprises at least one liquefaction cold box, at least one deep cooling cryogenic storage cycle, and at least one intermediate cooling cryogenic storage cycle; the deep cooling cryogenic storage cycle is connected with the liquefaction cold box for releasing cryogenic energy from a deep cooling temperature to a room temperature; the intermediate cooling cryogenic storage cycle is connected with the liquefaction cold box for releasing cryogenic energy from a deep cooling temperature to an intermediate cooling temperature. Each liquefaction cold box includes at least one deep cooling cycle internal flow passage, at least one intermediate cooling cycle internal flow passage, at least one supercritical flow passage, at least one cryogenic energy compensation flow passage, and at least one cryogenic energy recovery flow passage; each deep cooling cryogenic storage cycle includes at least one deep cooling storage tank, at least one deep cooling cycle fan, and at least one deep cooling cycle external flow passage, and each deep cooling cycle external flow passage is connected with at least one deep cooling storage tank and at least one deep cooling cycle fan, and connected with a deep cooling cycle internal flow passage in the liquefaction cold box to form a complete cycle flow passage; each intermediate cooling cryogenic storage cycle includes at least one intermediate cooling storage tank, at least one intermediate cooling cycle fan, and at least one intermediate cooling cycle external flow passage, and each intermediate cooling cycle external flow passage is connected with at least one intermediate cooling storage tank and at least one intermediate cooling cycle fan, and connected with an intermediate cooling cycle internal flow passage in the liquefaction cold box to form a complete cycle flow passage.

The staged cryogenic storage subsystem further comprises at least one evaporation cold box, and the evaporation cold box and the liquefaction cold box share at least one deep cooling cryogenic storage cycle and at least one intermediate cooling cryogenic storage cycle; the deep cooling cryogenic storage cycle is connected with the evaporation cold box to store cryogenic energy from a deep cooling temperature to a room temperature; the intermediate cooling cryogenic storage cycle is connected with the evaporation cold box to store cryogenic energy from a deep cooling temperature to an intermediate cooling temperature. The evaporation cold box comprises at least one deep cooling cycle internal flow passage, at least one intermediate cooling cycle internal flow passage, and at least one supercritical flow passage; each deep cooling cycle external flow passage in the deep cooling cryogenic storage cycle is connected with at least one deep cooling storage tank and at least one deep cooling cycle fan, and connected with a deep cooling cycle internal flow passage in the evaporation cold box to form a complete cycle flow passage; each intermediate cooling cycle external flow passage in the intermediate cooling cryogenic storage cycle is connected with at least one intermediate cooling storage tank and at least one intermediate cooling cycle fan, and connected with an intermediate cooling cycle internal flow passage in the evaporation cold box to form a complete cycle flow passage.

The liquefaction cold box and the evaporation cold box each comprise a heat exchanger group, a cryogenic insulation material, and a sealed housing; the heat exchanger group comprises at least one plate-fin heat exchanger, or at least one plate heat exchanger, or at least one coiled tubular heat exchanger; the cryogenic insulation material comprises one of glass fiber mat, pearlite, rock wool, and vacuum board, or a combination thereof.

In an embodiment of the present disclosure, the liquefaction cold box and the evaporation cold box may share the same cold box. In this case, the cold box is used as a liquefaction cold box or an evaporation cold box, the staged cryogenic storage subsystem comprises at least one deep cooling cryogenic storage cycle, and at least one intermediate cooling cryogenic storage cycle. Each cold box can be used for both releasing cryogenic energy and storing cryogenic energy. Each cold box includes at least one deep cooling cycle internal flow passage, at least one intermediate cooling cycle internal flow passage, and at least one supercritical flow passage. The deep cooling cryogenic storage cycle is connected with the cold box for releasing and/or storing cryogenic energy from a deep cooling temperature to a room temperature. Each deep cooling cryogenic storage cycle includes at least one deep cooling storage tank, at least one deep cooling cycle fan, and at least one deep cooling cycle external flow passage, and each deep cooling cycle external flow passage is connected with at least one deep cooling storage tank and at least one deep cooling cycle fan, and connected with a deep cooling cycle internal flow passage in the cold box to form a complete cycle flow passage. The intermediate cooling cryogenic storage cycle is connected with the cold box for releasing and/or storing cryogenic energy from a deep cooling temperature to an intermediate temperature. Each intermediate cooling cryogenic storage cycle includes at least one intermediate cooling storage tank, at least one intermediate cooling cycle fan, and at least one intermediate cooling cycle external flow passage, and each intermediate cooling cycle external flow passage is connected with at least one intermediate cooling storage tank and at least one intermediate cooling cycle fan, and connected with an intermediate cooling cycle internal flow passage in the cold box to form a complete cycle flow passage.

In a case where the number of the intermediate cooling cryogenic storage cycles is greater than 1, the intermediate cooling cryogenic storage cycles respectively store cryogenic energy between different intermediate cooling temperatures.

In a case where the at least one intermediate cooling storage tank comprises two intermediate cooling storage tanks, the two intermediate cooling storage tanks are connected in series or in parallel; when the two intermediate cooling storage tanks are connected in series, one of the intermediate cooling storage tanks is divided into a deep cooling side and a room temperature side for storing cryogenic energy from a deep cooling temperature to a room temperature therein; the other of the intermediate cooling storage tanks is divided into an intermediate cooling side and a room temperature side for storing cryogenic energy from an intermediate cooling temperature to a room temperature therein, and an intermediate cooling cycle fan is connected in series between the room temperature sides of the two intermediate cooling storage tanks; when the two intermediate cooling storage tanks are connected in parallel, the two intermediate cooling storage tanks each store cryogenic energy from the deep cooling temperature to the intermediate cooling temperature therein.

The deep cooling storage tank and the intermediate cooling storage tank are both of a packed bed structure, and the packed bed structure is filled with a cryogenic resistant storage material therein, cycle working medium flows in gaps of the filled cryogenic resistant storage material and exchanges cold amount; the cycle working medium is one of air, nitrogen, argon and helium, or a combination thereof, and the cryogenic resistant storage material is one of ceramic, stone, alumina, metal, encapsulated stage change particle, chemical reaction particle, or a combination thereof.

The deep cooling cycle fan and the intermediate cooling cycle fan are both bidirectional cycle fans, flow passages of the fans are sealed, and air flow rate of the fans is adjustable.

The deep cooling temperature does not exceed cryogenic liquid temperature in a cryogenic insulation tank $30k$, and the intermediate cooling temperature is between the deep cooling temperature and the room temperature.

The supercritical liquefaction subsystem comprises an electric motor, at least one multistage compressor, a drying and purifying device, a proportional adjustment device, a liquid expander, a gas-liquid separator and a cryogenic insulation tank; the electric motor is connected with the multistage compressor by a shaft connection, stages of the multistage compressor are connected by two ways, one way is for shaft connection, and the other is for gas path connection; the drying and purifying device is disposed on a gas path of the multistage compressor for reducing component content of water vapor, carbon dioxide, and alkane in the air; the electric motor is to drive the multistage compressor to perform a multistage compression of the input gaseous air to form supercritical air, the supercritical air at an outlet of the multistage compressor enters the proportional adjustment device to be split, and one split branch of supercritical air enters the supercritical flow passage of the liquefaction cold box of the staged cryogenic storage subsystem, and then passes through the liquid expander and the gas-liquid separator to form liquid air, and then the liquid air enters the cryogenic insulation tank through a liquid-side outlet of the gas-liquid separator. The proportional adjustment device of the supercritical liquefaction subsystem is internally provided with a flow rate adjusting mechanism for adjusting a proportion of flow rate of the supercritical air in two branches split by the proportional adjustment device.

The evaporation and expansion subsystem comprises at least one cryopump, a multistage expander and an electric generator, and the liquid air output from the cryogenic insulation tank passes through the cryopump and the supercritical flow passage of the evaporation cold box of the staged cryogenic storage subsystem and evaporates to form supercritical air, and the supercritical air formed by evaporation enters the multistage expander to do work and drive the electric generator to generate electricity; the electric generator is connected with the multistage expander by a shaft connection, stages of the multistage expander are connected by two ways, one way is for shaft connection, and the other is for gas path connection.

The evaporation and expansion subsystem further comprises a preheater placed at a position before where the supercritical air enters the multistage expander, and exhaust gas from an outlet of the multistage expander enters the preheater to form a gas circuit for recovering higher temperature of heat energy at the outlet of the multistage expander. The preheater is one of a plate-fin heat exchanger, a plate heat exchanger, a shell-tube heat exchanger, a spiral plate heat exchanger, or a combination thereof.

The compressed air energy storage system further comprises a heat storage and heat exchange subsystem comprising at least one heat storage tank, at least one room temperature tank, at least two heat regenerators, at least two reheaters, and the heat regenerators are independent of each other and the reheaters are independent of each other; an outlet of the room temperature tank is connected with one end of each heat regenerator, and the other end of each heat regenerator is connected with an inlet of the heat storage tank; an outlet of the heat storage tank is connected with one end of each reheater, and the other end of each reheater is connected with an inlet of the room temperature tank; at least one heat regenerator is connected between the stages of the multistage compressor of the supercritical liquefaction subsystem, and at least one heat regenerator is connected between the multistage compressor of the supercritical liquefaction subsystem and the proportional adjustment device; at least one reheater is connected to the multistage expander at a position before the supercritical air formed by evaporation will enter the multistage expander, and at least one reheater is connected between the stages of the multistage expander in a gas path of the evaporation and expansion subsystem. The heat storage and heat exchange subsystem further comprises a residual heat utilization device located between an outlet of the reheater and an inlet of the room temperature tank for recovering residual heat of heat storage working medium at the outlet of the reheater. The residual heat utilization device of the heat storage and heat exchange subsystem is a heat supply and heat exchanger or a refrigeration unit or a combination thereof.

The compressed air energy storage system further comprises a cryogenic energy compensation subsystem for compensating for cryogenic energy autonomously. Specifically, in a case where the staged cryogenic storage subsystem comprises at least one liquefaction cold box and at least one evaporation cold box, the other branch of supercritical air split by the proportional adjustment device of the supercritical liquefaction subsystem enters the cryogenic energy compensation flow passage of the liquefaction cold box of the staged cryogenic storage subsystem and cools, and then enters the cryogenic expansion unit to expand and cool further, and mixes with cryogenic air at a gas-side outlet of the gas-liquid separator in the mixer, the cryogenic energy is recovered by the cryogenic energy recovery flow passage of the liquefaction cold box of the staged cryogenic storage subsystem, and then the air returns to the inlet of the multistage compressor or returns to gas paths between the stages of the multistage compressor; or in a case where the staged cryogenic storage subsystem comprises at least one cold box for liquefaction and evaporation, the cold box is connected with the cryogenic energy compensation subsystem, further comprises at least one cryogenic energy compensation flow passage and at least one cryogenic energy recovery flow passage; the other branch of supercritical air split by the proportional adjustment device of the supercritical liquefaction subsystem enters the cryogenic energy compensation flow passage of the cold box of the staged cryogenic storage subsystem and cools, and then enters the cryogenic expansion unit to expand and cool further, and mixes with cryogenic air at a gas-side outlet of the gas-liquid separator in the mixer, the cryogenic energy is recovered by the cryogenic energy recovery flow passage of the cold box of the staged cryogenic storage subsystem, and then the air returns to the inlet of the multistage compressor or returns to gas paths between the stages of the multistage compressor.

The staged cryogenic storage type supercritical compressed air energy storage method according to the present disclosure may be applied to the staged cryogenic storage type supercritical compressed air energy storage system. FIG. 1 is a flow chart of a staged cryogenic storage supercritical compressed air energy storage method according to an embodiment of the present disclosure, as shown in FIG. 1, the method includes:

S101: converting input gaseous air into liquid air by the supercritical liquefaction subsystem. Specifically, the electric motor drives the multistage compressor to perform a multistage compression of the input air to form supercritical air, the supercritical air at an outlet of the multistage compressor enters the proportional adjustment device to be split, and one split branch of supercritical air enters the supercritical flow passage of the liquefaction cold box of the staged cryogenic storage subsystem, and then passes through the liquid expander for expansion and the gas-liquid separator for separation to form liquid air, and then the liquid air enters the cryogenic insulation tank through a liquid-side outlet of the gas-liquid separator.

S102: converting the liquid air into the gaseous air by the evaporation and expansion subsystem. Specifically, the liquid air output from the cryogenic insulation tank passes through the cryopump and the supercritical flow passage of the evaporation cold box of the staged cryogenic storage subsystem and evaporates to form supercritical air, and the supercritical air formed by evaporation enters the multistage expander to do work and drive the electric generator to generate electricity.

S103: storing and/or releasing cryogenic energy by the staged cryogenic storage subsystem when the gaseous air or the liquid air is converted. Specifically, a cycle fan drives cycle working medium to input cryogenic energy in a deep cooling storage tank and an intermediate cooling storage tank into a deep cooling cycle internal flow passage and an intermediate cooling cycle internal flow passage of the liquefaction cold box respectively, to provide supercritical air in a supercritical flow passage with cryogenic energy for liquefaction; and a cycle fan drives cycle working medium to input cryogenic energy in the deep cooling storage tank and the intermediate cooling storage tank into the deep cooling cycle internal flow passage and the intermediate cooling cycle internal flow passage of the evaporation cold box respectively, to provide supercritical air in a supercritical flow passage with heat energy for evaporation and store cryogenic energy.

The staged cryogenic storage type supercritical compressed air energy storage method according to the present disclosure further includes:

S104: storing the heated heat storage working medium in the heat storage tank and returning the cooled heat storage working medium to the room temperature tank by the heat storage and heat exchange subsystem. Specifically, storing the heat storage working medium heated by absorption of compression heat in various heat regenerators in the heat storage tank; and allowing the heat storage working medium at liquid-side outlets of various reheaters to further absorb heat energy of the heat storage working medium by the residual heat utilization device and output cryogenic energy close to the room temperature, and returning the cooled heat storage working medium to the room temperature tank.

The staged cryogenic storage type supercritical compressed air energy storage method according to the present disclosure further includes:

S105: compensating for cryogenic energy autonomously by the cryogenic energy compensation subsystem. Specifically, in a case where the staged cryogenic storage subsystem comprises at least one liquefaction cold box and at least one evaporation cold box, the other branch of supercritical air split by the proportional adjustment device of the supercritical liquefaction subsystem enters the cryogenic energy compensation flow passage of the liquefaction cold box of the staged cryogenic storage subsystem and cools, and then enters the cryogenic expansion unit to expand and cool further, and mixes with cryogenic air at the gas-side outlet of the gas-liquid separator in the mixer, the cryogenic energy is recovered by the cryogenic energy recovery flow passage of the liquefaction cold box of the staged cryogenic storage subsystem, and then the supercritical air returns to the inlet of the multistage compressor or returns to gas paths between the stages of the multistage compressor; or in a case where the staged cryogenic storage subsystem comprises at least one cold box for liquefaction and evaporation, the cold box is connected with the cryogenic energy compensation subsystem, further comprises at least one cryogenic energy compensation flow passage and at least one cryogenic energy recovery flow passage; the other branch of supercritical air split by the proportional adjustment device of the supercritical liquefaction subsystem enters the cryogenic energy compensation flow passage of the cold box of the staged cryogenic storage subsystem and cools, and then enters the cryogenic expansion unit to expand and cool further, and mixes with the cryogenic air at the gas-side outlet of the gas-liquid separator in the mixer, the cryogenic energy is recovered by the cryogenic energy recovery flow passage of the cold box of the staged cryogenic storage subsystem, and then the air returns to the inlet of the multistage compressor or returns to gas paths between the stages of the multistage compressor.

First Embodiment

Figure 2:
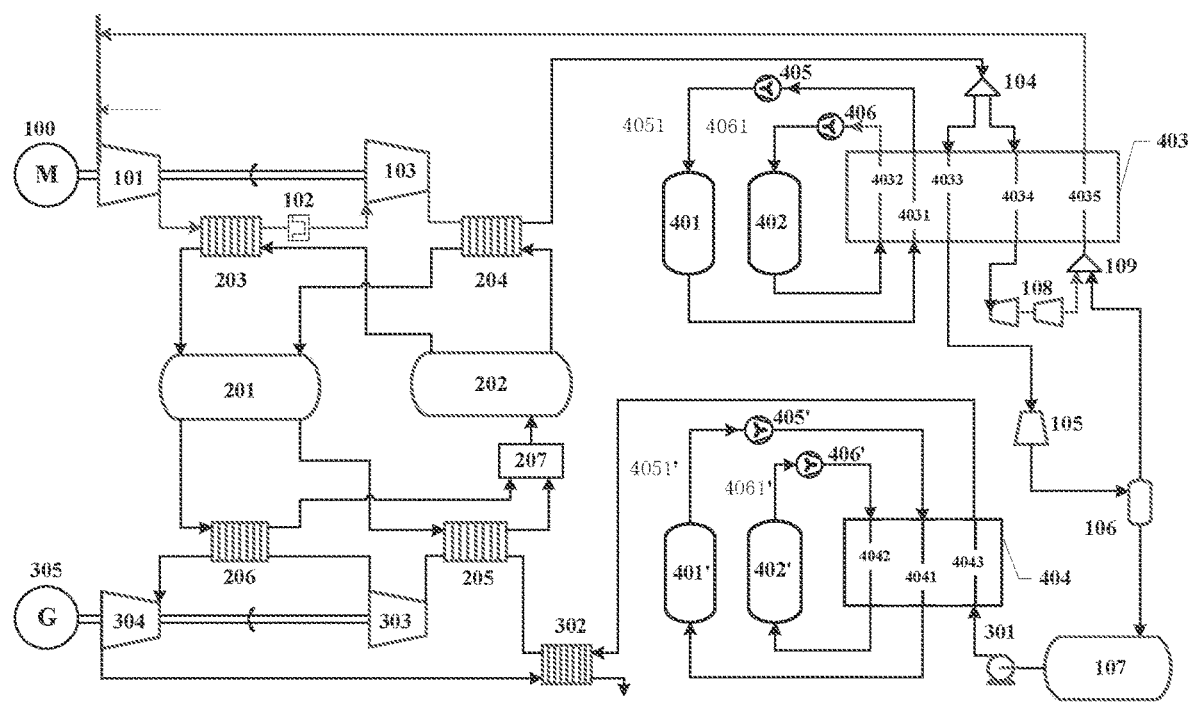
FIG. 2 is a schematic view of a staged cryogenic storage supercritical compressed air energy storage system with a single deep cooling cryogenic storage cycle in combination with an intermediate cooling storage tank according to an embodiment of the present disclosure.

FIG. 2 is a schematic view of a staged cryogenic storage supercritical compressed air energy storage system with a single deep cooling cryogenic storage cycle in combination with an intermediate cooling storage tank according to an embodiment of the present disclosure.

In this embodiment, the working medium is heat transfer oil, the compressor is a two-stage compressor, the expander is a two-stage expander, and a single heat storage tank, a single room temperature tank, a single cryogenic insulation tank, and a single staged cryogenic storage subsystem are adopted. The staged cryogenic storage subsystem includes a single deep cooling storage tank, a single intermediate cooling storage tank, a single liquefaction cold box, and a single evaporation cold box. The residual heat utilization device is an absorption refrigeration unit, the cryogenic expander is a two-stage expander, and the pressure in the cryogenic storage tank is close to the atmospheric pressure. The gas returned from the cryogenic energy recovery flow passage 4035 of the liquefaction cold box of this embodiment is returned to the inlet of the first stage compressor 101.

The usage process is as follows:

I. In the initial stage of energy storage, an electric motor 100 drives the first stage compressor 101 to compress the normobaric air and the returned air from the outlet of the cryogenic energy recovery flow passage 4035. The compressed air exchanges heat with the inter-stage heat regenerator 203, and then is input to the drying and purifying device 102 to reduce component contents of water vapor, carbon dioxide, and alkane, and the dried and purified compressed air is further compressed in the final stage compressor 103 and heat-exchanged, and then is input to the proportional adjustment device 104 in a supercritical state. The heat storage working medium heated by compression heat in various heat regenerators 203 and 204 is stored in the heat storage tank 201.

II. The cycle fans 405 and 406 drive the cycle working medium to input the cryogenic energy in the deep cooling storage tank 401 and the intermediate cooling storage tank 402 into the deep cooling cycle internal flow passage 4031 and the intermediate cooling cycle internal flow passage 4032 of the liquefaction cold box 403 respectively, to provide supercritical air in the supercritical flow passage 4033 with cryogenic energy for liquefaction. The deep cooling cycle external flow passage 4051 is connected with the deep cooling storage tank 401 and the deep cooling cycle fan 405, and connected with the deep cooling cycle internal flow passage 4032 in the liquefaction cold box 403 to form a complete cycle flow passage. The intermediate cooling cycle external flow passage 4061 is connected with the intermediate cooling storage tank 402 and the intermediate cooling cycle fan 406, and connected with the intermediate cooling cycle internal flow passage 4031 in the liquefaction cold box 403 to form a complete cycle flow passage.

III. The supercritical air is split by the proportional adjustment device 104 and then output at a certain ratio of flow rate. Most of it enters the supercritical flow passage 4033 of the liquefaction cold box, absorbs the cryogenic energy to cool down, and then is liquefied into high pressure fluid. The other part of the supercritical air enters the cryogenic energy compensation flow passage 4034 of the liquefaction cold box, absorbs part of the cryogenic energy to cool down, and then is further expanded and cooled by the cryogenic expansion unit 108 to be cryogenic gas close to the atmospheric pressure, which compensates the cryogenic energy for the whole system.

IV. After the supercritical air is liquefied, it is expanded into a gas-liquid mixed fluid close to the atmospheric pressure by the liquid expander 105, and enters the gas-liquid separator 106. The separated cryogenic gas is mixed with the cryogenic gas which has been expanded and cooled down at the outlet of the cryogenic energy compensation flow passage 4034 in the mixer 109. The mixed cryogenic gas close to the atmospheric pressure is input to the cryogenic energy recovery flow passage 4035 of the liquefaction cold box to recover cryogenic energy and compensate for the shortage of cryogenic energy. The liquid air separated in the gas-liquid separator 106 is collected and stored in the cryogenic adiabatic storage tank 107 to complete the storage of energy.

V. In the energy release process, the liquid air is pressurized by the cryopump 301 and then input to the evaporation cold box 404. The cycle working medium in the deep cooling storage tank 401' and the intermediate cooling storage tank 402' is driven by the cycle fans 405' and 406' and input into the deep cooling cycle internal flow passage 4041 and the intermediate cooling cycle internal flow passage 4042 of the evaporation cold box respectively. The cycle working medium absorbs the cold amount released by the evaporation of the liquid air in the evaporation flow passage 4043 in the evaporation cold box, and then enters the deep cooling storage tank 401' and the intermediate cooling storage tank 402' respectively, thereby completing the recovery and storage of cryogenic energy. The evaporation cold box 404 and the liquefaction cold box 403 share the deep cooling cryogenic storage cycle and the intermediate cooling cryogenic storage cycle. The deep cooling storage tank 401 and the deep cooling storage tank 401' are actually the same one deep cooling storage tank, and the intermediate cooling storage tank 402 and the intermediate cooling storage tank 402' are actually the same one intermediate cooling storage tank. The deep cooling cycle fan 405 and the deep cooling cycle fan 405' are actually the same one deep cooling cycle fan, and the intermediate cooling cycle fan 406 and the intermediate cooling cycle fan 406' are actually the same one intermediate cooling cycle fan. The deep cooling cycle external flow passage 4051 and the deep cooling cycle external flow passage 4051' are actually the same one deep cooling cycle external flow passage, and the intermediate cooling cycle external flow passage 4061 and the intermediate cooling cycle external flow passage 4061' are actually the same one intermediate cooling cycle external flow passage. The evaporation cold box comprises a deep cooling cycle internal flow passage 4041, an intermediate cooling cycle internal flow passage 4042 and a supercritical flow passage 4043; the deep cooling cycle external flow passage 4051' in the deep cooling cryogenic storage cycle is connected with the deep cooling storage tank 401' and the deep cooling cycle fan 405', and connected with the deep cooling cycle internal flow passage 4042 in the evaporation cold box 404 to form a complete cycle flow passage; the intermediate cooling cycle external flow passage 4061' in the intermediate cooling storage cycle is connected with the intermediate cooling storage tank 402' and the intermediate cooling cycle fan 406', and connected with the intermediate cooling cycle internal flow passage 4041 in the evaporation cold box 404 to form a complete cycle flow passage.

VI. The supercritical air at the outlet of the evaporation flow passage 4043 of the evaporation cold box is input to the preheater 302, and heat-exchanged with the higher temperature of exhaust gas at the outlet of the final stage expander 304 to further increase the temperature of the supercritical air. The preheated supercritical air passes through the reheater 205 to absorb the heat of the heat storage working medium, and then enters the first stage expander 303 to do work and drive the electric generator 305 to generate electricity. The compressed air at the outlet of the first stage expander 303 enters the final stage reheater 206 and is reheated, and then enters the final stage expander 304 to do work through expansion.

VII. The heat storage working medium at the liquid-side outlets of the various reheaters 205 and 206 still have a relatively high temperature. The residual heat utilization device 207 further absorbs the heat energy of the heat storage working medium and outputs the cryogenic energy close to the room temperature, and then the cooled heat storage working medium returns to the room temperature tank 202.

Second Embodiment

Figure 3:
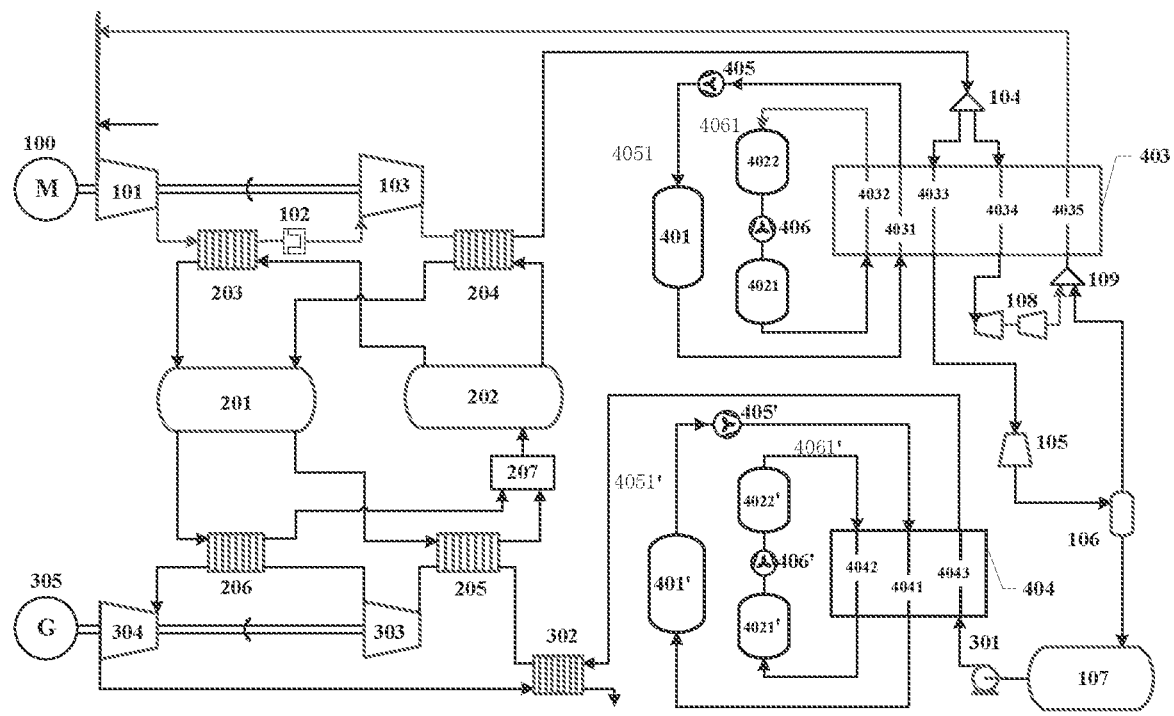
FIG. 3 is a schematic view of a staged cryogenic storage supercritical compressed air energy storage system according to an embodiment of the present disclosure, in which the intermediate cooling storage tank is of a structure of dual tanks in series.

FIG. 3 is a schematic view of a staged cryogenic storage supercritical compressed air energy storage system according to an embodiment of the present disclosure, in which the intermediate cooling storage tank is of a structure of dual tanks in series. As shown in FIG. 3, this embodiment is improved with respect to the first embodiment in that: the at least one intermediate cooling storage tank includes two intermediate cooling storage tanks, an intermediate and lower cooling storage tank 4021 and an intermediate and upper cooling storage tank 4022 are connected in series. The intermediate and lower cooling storage tank 4021 stores the cryogenic energy from the intermediate cooling temperature to the room temperature, and the intermediate and upper cooling storage tank 4022 stores the cryogenic energy from the deep cooling temperature to the room temperature. The room temperature sides of the intermediate and lower cooling storage tank 4021 and the intermediate and upper cooling storage tank 4022 are connected by the intermediate cooling cycle fan 406. In this way, the advantage is that the intermediate cooling cycle fan 406 can be operated at a room temperature to avoid the temperature of the intermediate cooling temperature cycle working medium at the outlet of the fan from increasing significantly due to the compression heat, and thereby the loss of the cryogenic energy. Similarly, an intermediate and lower cooling storage tank 4021' and an intermediate and upper cooling storage tank 4022' are connected in series. The intermediate and lower cooling storage tank 4021' stores the cryogenic energy from the intermediate cooling temperature to the room temperature, and the intermediate and upper cooling storage tank 4022' stores the cryogenic energy from the deep cooling temperature to the room temperature. The room temperature sides of the intermediate and lower cooling storage tank 4021' and the intermediate and upper cooling storage tank 4022' are connected by the intermediate cooling cycle fan 406'. In this way, the advantage is that the intermediate cooling cycle fan 406' can be operated at a room temperature to avoid the temperature of the intermediate cooling temperature cycle working medium at the outlet of the fan from increasing largely due to the compression heat, and thereby the loss of the cryogenic energy. The intermediate cooling cycle fan 406 and the intermediate cooling cycle fan 406' are actually the same one intermediate cooling cycle fan, and the intermediate and lower cooling storage tank 4021 and the intermediate and lower cooling storage tank 4021' are actually the same one intermediate and lower cooling storage tank, and the intermediate and upper cooling storage tank 4022 and the intermediate and upper cooling storage tank 4022' are actually the same one intermediate and upper cooling storage tank.

Third Embodiment

Figure 4:
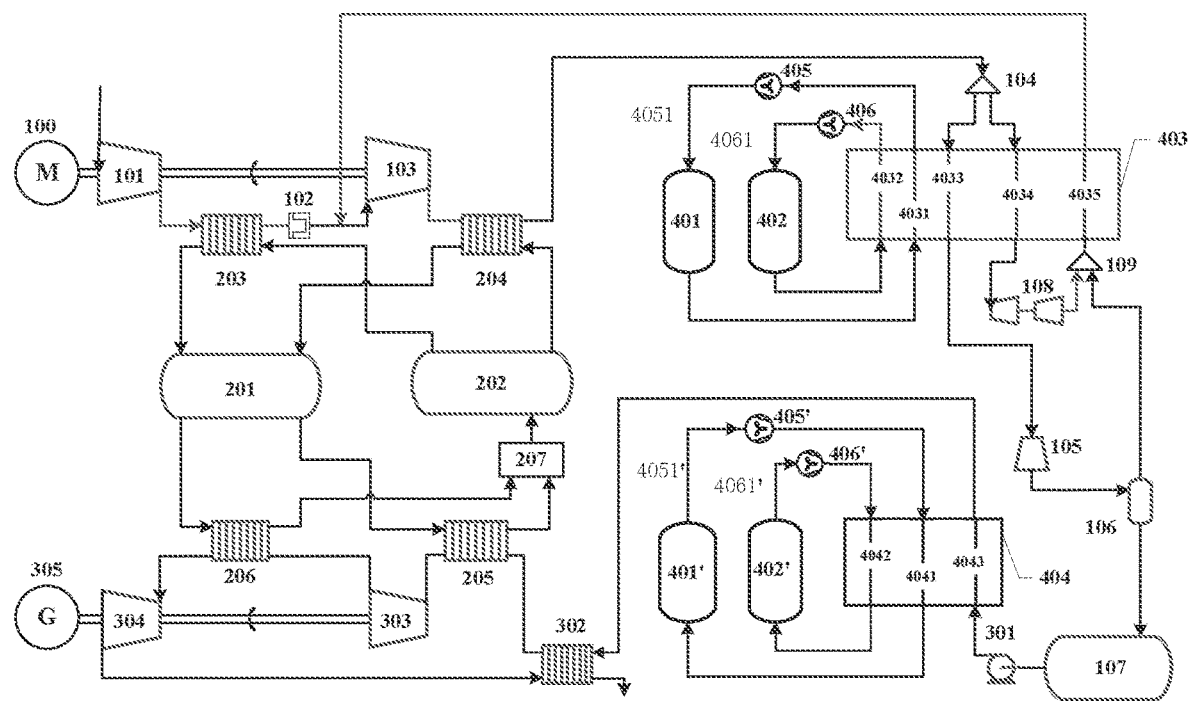
FIG. 4 is a schematic view of a staged cryogenic storage supercritical compressed air energy storage system according to an embodiment of the present disclosure, in which a cryogenic insulation tank is at a higher pressure.

FIG. 4 is a schematic view of a staged cryogenic storage supercritical compressed air energy storage system according to an embodiment of the present disclosure, in which a cryogenic insulation tank is at a higher pressure. As shown in FIG. 4, this embodiment is improved with respect to the first embodiment in that: the gas returned from the cryogenic energy recovery flow passage 4035 of the liquefaction cold box is returned to the gas path between the drying and purifying device 102 and the final stage compressor, rather than to the inlet of the first stage compressor 101. In this case, the pressure of the liquid air stored in the cryogenic insulation tank 107 is not close to the atmospheric pressure, but is much higher than the atmospheric pressure.

In the energy storage stage, the supercritical fluid in the cryogenic energy compensation flow passage 4034 of the liquefaction cold box absorbs part of the cryogenic energy and is cooled, and then is expanded to a pressure close to the pressure of the cryogenic insulation tank 107 by the two-stage cryogenic expander 108, and is mixed with the cryogenic gas separated by the gas-liquid separator in the mixer 109 and then input into the cryogenic energy recovery flow passage 4035. The cryogenic energy recovery flow passage 4035 is connected with the inlet of the final stage compressor 103, the fluid is mixed with the compressed air compressed by the first stage compressor 101 and then input to the final stage compressor 103 to be compressed into the supercritical air.

Fourth Embodiment

Figure 5:
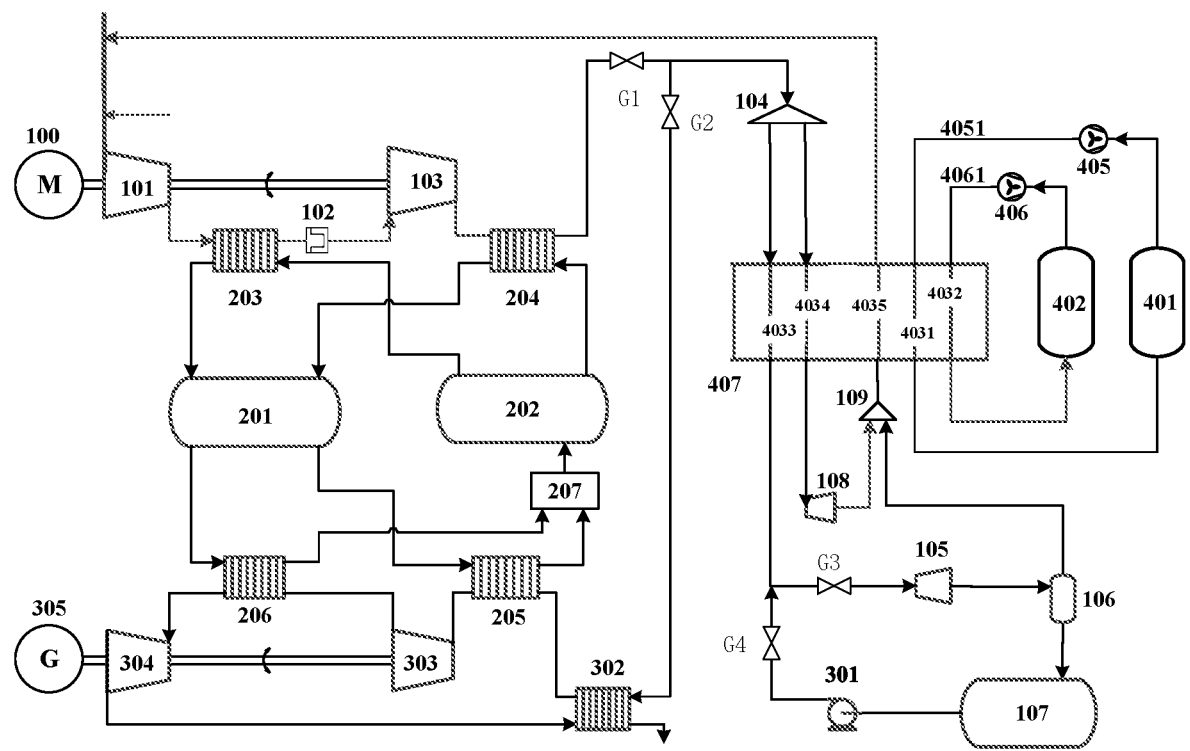
FIG. 5 is a schematic view of a staged cryogenic storage supercritical compressed air energy storage system including a cold box according to an embodiment of the present disclosure.

FIG. 5 is a schematic view of a staged cryogenic storage supercritical compressed air energy storage system including a cold box according to an embodiment of the present disclosure. As shown in FIG. 5, this embodiment is improved with respect to the first embodiment in that: the liquefaction cold box and the evaporation cold box share the same cold box, that is, only one cold box 407 is provided. The cold box not only can be used as a liquefaction cold box for releasing cryogenic energy, but also can be used as an evaporation cold box for storing cryogenic energy. In the initial stage of energy storage, the first valve G1 and the third valve G3 are opened, and the second valve G2 and the fourth valve G4 are closed. The supercritical air enters the proportional adjustment device 104 via the second valve G2; the supercritical air is split by the proportional adjustment device 104, and then most of it enters the supercritical flow passage 4033 of the cold box, and then enters the liquid expander 105 via the third valve G3. In the energy release process, the first valve G1 and the third valve G3 are closed, the second valve G2 and the fourth valve G4 are opened. The liquid air is pressurized by the cryopump 301 and then input to the supercritical flow passage 4033 of the liquefaction cold box via the fourth valve G4. The supercritical air output by the supercritical flow passage 4033 is input into the preheater 302 through the proportional adjustment device 104 via the second valve G2.

The objectives, technical solutions and beneficial effects of the present disclosure have been described in detail with reference to the above specific embodiments. It should be understood that the foregoing description only refers to the specific embodiments of the present disclosure, but are not intended to limit the present disclosure. Any modifications, equivalent substitutions, improvements, etc., made within the spirit and scope of the present disclosure fall within the scope of the present disclosure.

What is claimed is:

1. A staged cryogenic storage type supercritical compressed air energy storage system, comprising a supercritical liquefaction subsystem for converting input gaseous air into liquid air and an evaporation and expansion subsystem for converting liquid air into gaseous air, wherein the staged cryogenic storage type supercritical compressed air energy storage system further comprises:
a staged cryogenic storage subsystem for storing and/or releasing cryogenic energy when the gaseous air or the liquid air is converted,
wherein the staged cryogenic storage subsystem comprises at least one cold box, at least one deep cooling cryogenic storage cycle, and at least one intermediate cooling cryogenic storage cycle,
wherein the cold box is used as a liquefaction cold box or an evaporation cold box,
wherein the deep cooling cryogenic storage cycle is connected with the cold box for releasing cryogenic energy from a deep cooling temperature to a room temperature when the cold box is used as the liquefaction cold box, and for storing cryogenic energy from the deep cooling temperature to the room temperature when the cold box is used as the evaporation cold box,
wherein the intermediate cooling cryogenic storage cycle is connected with the cold box for releasing cryogenic energy from the deep cooling temperature to an intermediate cooling temperature or storing cryogenic energy from the intermediate cooling temperature to the room temperature when the cold box is used as the liquefaction cold box, and for storing cryogenic energy from the deep cooling temperature to the intermediate cooling temperature or releasing cryogenic energy from the intermediate cooling temperature to the room temperature when the cold box is used as the evaporation cold box,
wherein the intermediate cooling temperature is between the deep cooling temperature and the room temperature,
wherein the cold box includes at least one deep cooling cycle internal flow passage, at least one intermediate cooling cycle internal flow passage, at least one supercritical flow passage, and at least one cryogenic energy recovery flow passage,
wherein the deep cooling cryogenic storage cycle includes at least one deep cooling storage tank, at least one deep cooling cycle fan, and at least one deep cooling cycle external flow passage, and the at least one deep cooling cycle external flow passage is connected with at least one deep cooling storage tank and at least one deep cooling cycle fan, and connected with a deep cooling cycle internal flow passage in the cold box to form a complete cycle flow passage, and
wherein the intermediate cooling cryogenic storage cycle includes at least one intermediate cooling storage tank, at least one intermediate cooling cycle fan, and at least one intermediate cooling cycle external flow passage, and the at least one intermediate cooling cycle external flow passage is connected with at least one intermediate cooling storage tank and at least one intermediate cooling cycle fan, and connected with an intermediate cooling cycle internal flow passage in the cold box to form a complete cycle flow passage.

2. The system according to claim 1, wherein the staged cryogenic storage subsystem comprises at least one liquefaction cold box, at least one deep cooling cryogenic storage cycle, and at least one intermediate cooling cryogenic storage cycle,
wherein the deep cooling cryogenic storage cycle is connected with the liquefaction cold box for storing/releasing cryogenic energy from the deep cooling temperature to the room temperature, wherein the intermediate cooling cryogenic storage cycle is connected with the liquefaction cold box for storing/releasing cryogenic energy from the deep cooling temperature to an intermediate cooling temperature or cryogenic energy from the intermediate cooling temperature to the room temperature.

3. The system according to claim 2, wherein the at least one liquefaction cold box includes at least one deep cooling cycle internal flow passage, at least one intermediate cooling cycle internal flow passage, at least one supercritical flow passage, at least one cryogenic energy compensation flow passage, and at least one cryogenic energy recovery flow passage,
wherein the deep cooling cryogenic storage cycle includes at least one deep cooling storage tank, at least one deep cooling cycle fan, and at least one deep cooling cycle external flow passage, and the deep cooling cycle external flow passage is connected with at least one deep cooling storage tank and at least one deep cooling cycle fan, and connected with a deep cooling cycle internal flow passage in the liquefaction cold box to form a complete cycle flow passage,
wherein the intermediate cooling cryogenic storage cycle includes at least one intermediate cooling storage tank, at least one intermediate cooling cycle fan, and at least one intermediate cooling cycle external flow passage, and the intermediate cooling cycle external flow passage is connected with at least one intermediate cooling storage tank and at least one intermediate cooling cycle fan, and connected with an intermediate cooling cycle internal flow passage in the liquefaction cold box to form a complete cycle flow passage.

4. The system according to claim 3, wherein the staged cryogenic storage subsystem further comprises at least one evaporation cold box, and the evaporation cold box and the liquefaction cold box share at least one deep cooling cryogenic storage cycle and at least one intermediate cooling cryogenic storage cycle,
wherein the evaporation cold box comprises at least one deep cooling cycle internal flow passage, at least one intermediate cooling cycle internal flow passage, and at least one supercritical flow passage,
wherein the deep cooling cryogenic storage cycle is connected with the evaporation cold box to store cryogenic energy from the deep cooling temperature to the room temperature,
wherein the intermediate cooling cryogenic storage cycle is connected with the evaporation cold box to store cryogenic energy from the deep cooling temperature to the intermediate cooling temperature or to release cryogenic energy from the intermediate cooling temperature to the room temperature.

5. The system according to claim 2, wherein in a case where the number of the intermediate cooling cryogenic storage cycles is greater than 1, the respective intermediate cooling cryogenic storage cycles store cryogenic energy between different intermediate cooling temperatures.

6. The system according to claim 4, wherein the deep cooling storage tank and the intermediate cooling storage tank are both of a packed bed structure, and the packed bed structure is filled with a cryogenic resistant storage material therein, cycle working medium flows in gaps of the filled cryogenic resistant storage material and exchanges cold amount,
wherein the cycle working medium is one of air, nitrogen, argon and helium, or a combination thereof, and the cryogenic resistant storage material is one of ceramic, stone, alumina, metal, encapsulated stage change particles, chemical reaction particles, or a combination thereof.

7. The system according to claim 4, wherein the deep cooling cycle fan and the intermediate cooling cycle fan are both bidirectional cycle fans, flow passages of the fans are sealed, and air flow rate of the fans is adjustable.

8. The system according to claim 2, wherein the deep cooling temperature does not exceed cryogenic liquid temperature in a cryogenic insulation tank 30K.

9. The system according to claim 1, wherein the supercritical liquefaction subsystem comprises an electric motor, at least one multistage compressor, a drying and purifying device, a proportional adjustment device, a liquid expanding device, a gas-liquid separator and a cryogenic insulation tank,
wherein the electric motor is connected with the multistage compressor by a shaft connection, stages of the multistage compressor are connected by two ways, one way is the shaft connection, and the other is a gas path connection; the drying and purifying device is disposed on a gas path of the multistage compressor for reducing component contents of water vapor, carbon dioxide, and alkane in the air,
wherein the electric motor is configured to drive the multistage compressor to perform a multistage compression of the input gaseous air to form supercritical air, the the supercritical air at an outlet of the multistage compressor enters the proportional adjustment device to be split into two split branches of supercritical air flow, wherein one of the split branches of supercritical air enters the supercritical flow passage in the liquefaction cold box of the staged cryogenic storage subsystem, and then passes through the liquid expanding device for expansion and the gas-liquid separator for separation to form liquid air, and then the liquid air enters the cryogenic insulation tank through a liquid-side outlet of the gas-liquid separator,
wherein the evaporation and expansion subsystem comprises at least one cryopump, a multistage expander and an electric generator, and the liquid air output from the cryogenic insulation tank passes through the cryopump and the supercritical flow passage in the evaporation cold box of the staged cryogenic storage subsystem and evaporates to form the supercritical air, and the supercritical air formed by evaporation is heated by a reheater and then enters the multistage expander to do work and drive the electric generator to generate electricity; the electric generator is connected with the multistage expander by shaft connection, stages of the multistage expander are connected by two ways, one way is the shaft connection, and the other is a gas path connection.

10. The system according to claim 9, wherein the proportional adjustment device of the supercritical liquefaction subsystem is provided with a flow rate adjusting mechanism therein for adjusting a proportion of flow rates of the supercritical air in two branches split by the proportional adjustment device.

11. The system according to claim 9, wherein the evaporation and expansion subsystem further comprises a preheater placed at a position before the supercritical air enters the multistage expander, and exhaust gas from an outlet of the multistage expander enters the preheater to form a gas circuit for recovering heat energy of higher temperature at the outlet of the multistage expander.

12. The system according to claim 9, further comprising a heat storage and heat exchange subsystem, wherein the heat storage and heat exchange subsystem comprises at least one heat storage tank, at least one room temperature tank, at least one heat regenerator, at least one reheater,
wherein an outlet of the room temperature tank is connected with one end of the at least one heat regenerator, and the other end of the at least one heat regenerator is connected with an inlet of the heat storage tank,
wherein an outlet of the heat storage tank is connected with one end of the at least one reheater, and the other end of the at least one reheater is connected with an inlet of the room temperature tank,
wherein at least one heat regenerator is connected at a position after a compressor stage of the multistage compressor of the supercritical liquefaction subsystem,
wherein at least one reheater is connected at a position before an expander stage of the multistage expander in a gas path of the evaporation and expansion subsystem.

13. The system according to claim 12, further comprising a cryogenic energy compensation subsystem, wherein the cryogenic energy compensation subsystem comprises a cryogenic expansion unit and a mixer, the other branch of the two split branches of supercritical air split by the proportional adjustment device of the supercritical liquefaction subsystem enters the cryogenic energy compensation flow passage in the liquefaction cold box of the staged cryogenic storage subsystem and cools, and then enters the cryogenic expansion unit to expand and cools further, and mixes with cryogenic air at a gas-side outlet of the gas-liquid separator in the mixer, the cryogenic energy is recovered by the cryogenic energy recovery flow passage in the liquefaction cold box of the staged cryogenic storage subsystem, and then the air returns to the inlet of the multistage compressor or returns to gas paths between the stages of the multistage compressor.

14. The system according to claim 13, wherein the cold box, when connected with the cryogenic energy compensation subsystem, further comprises at least one cryogenic energy compensation flow passage; the other branch of the two split branches of supercritical air split by the proportional adjustment device of the supercritical liquefaction subsystem enters the cryogenic energy compensation flow passage in the cold box of the staged cryogenic storage subsystem and cools, and then enters the cryogenic expansion unit to expand and cool further, and mixes with cryogenic air at the gas-side outlet of the gas-liquid separator in the mixer, the cryogenic energy is recovered by the cryogenic energy recovery flow passage in the cold box of the staged cryogenic storage subsystem, and then the air returns to the inlet of the multistage compressor or returns to gas paths between the stages of the multistage compressor.

15. A staged cryogenic storage type supercritical compressed air energy storage method, applied to the staged cryogenic storage type supercritical compressed air energy storage system according to claim 1, comprising:
converting input gaseous air into liquid air by the supercritical liquefaction subsystem;
converting liquid air into gaseous air by the evaporation and expansion subsystem; and
storing and/or releasing cryogenic energy by the staged cryogenic storage subsystem when the gaseous air or the liquid air is converted.

16. The method according to claim 15, wherein the converting input gaseous air into liquid air by the supercritical liquefaction subsystem comprises:
driving the multistage compressor by the electric motor to perform a multistage compression of the input air to form supercritical air, enabling the supercritical air at an outlet of the multistage compressor to enter the proportional adjustment device to be split into two split branches of supercritical air flow, wherein one of the split branches of supercritical air to enter the supercritical flow passage in the liquefaction cold box of the staged cryogenic storage subsystem, and then to pass through the liquid expanding device for expansion and the gas-liquid separator for separation to form the liquid air, and then enabling the liquid air to enter the cryogenic insulation tank through a liquid-side outlet of the gas-liquid separator,
wherein the converting liquid air into gaseous air by the evaporation and expansion subsystem comprises:
passing and evaporating the liquid air output from the cryogenic insulation tank through the cryopump and the supercritical flow passage in the evaporation cold box of the staged cryogenic storage subsystem to form the supercritical air, and enabling the supercritical air formed by evaporation to enter the multistage expander to do work and drive the electric generator to generate electricity,
wherein storing the heated heat storage working medium in a heat storage tank and returning the cooled heat storage working medium to a room temperature tank by a heat storage and heat exchange subsystem comprises:
storing the heat storage working medium heated by compression heat in various heat regenerators into the heat storage tank;
allowing heat storage working medium in various reheaters to heat-exchange with the supercritical air to cool, allowing the heat storage working medium at liquid-side outlets of various reheaters to further absorb heat energy of the heat storage working medium by a residual heat utilization device and output cryogenic energy close to the room temperature, and returning the cooled heat storage working medium to the room temperature tank.

17. The method according to claim 15, wherein the storing and/or releasing cryogenic energy by the staged cryogenic storage subsystem when the gaseous air or the liquid air is converted comprises:
driving cycle working medium by a cycle fan to input cryogenic energy in a deep cooling storage tank and an intermediate cooling storage tank into a deep cooling cycle internal flow passage and an intermediate cooling cycle internal flow passage in the liquefaction cold box respectively, to provide supercritical air in a supercritical flow passage with cryogenic energy for liquefaction; and
driving cycle working medium by the cycle fan to input cryogenic energy in a deep cooling storage tank and an intermediate cooling storage tank into a deep cooling cycle internal flow passage and an intermediate cooling cycle internal flow passage in the evaporation cold box respectively, to provide supercritical air in a supercritical flow passage with heat energy for evaporation and store cryogenic energy.

18. The method according to claim 16, further comprising: compensating for cryogenic energy autonomously by a cryogenic energy compensation subsystem,
wherein the compensating for cryogenic energy autonomously by a cryogenic energy compensation subsystem comprises:

in a case where the staged cryogenic storage subsystem comprises at least one liquefaction cold box and at least one evaporation cold box, enabling the other branch of the two split branches of supercritical air split by the proportional adjustment device of the supercritical liquefaction subsystem to enter the cryogenic energy compensation flow passage in the liquefaction cold box of the staged cryogenic storage subsystem and cool, and then to enter the cryogenic expansion unit to expand and cool further, and to mix with cryogenic air at a gas-side outlet of the gas-liquid separator in the mixer, so that the cryogenic energy is recovered by the cryogenic energy recovery flow passage in the liquefaction cold box of the staged cryogenic storage subsystem, and then returning the air to the inlet of the multistage compressor or to gas paths between the stages of the multistage compressor; or in a case where the staged cryogenic storage subsystem comprises at least one cold box for liquefaction and evaporation, while the cold box is connected with the cryogenic energy compensation subsystem and further comprises at least one cryogenic energy compensation flow passage and at least one cryogenic energy recovery flow passage, enabling the other branch of supercritical air split by the proportional adjustment device of the supercritical liquefaction subsystem to enter the cryogenic energy compensation flow passage in the cold box of the staged cryogenic storage subsystem and cool, and then to enter the cryogenic expansion unit to expand and cool further, and to mix with cryogenic air at a gas-side outlet of the gas-liquid separator in the mixer, so that the cryogenic energy is recovered by the cryogenic energy recovery flow passage in the cold box of the staged cryogenic storage subsystem, and then returning the air to the inlet of the multistage compressor or to gas paths between the stages of the multistage compressor.

* * * * *